United States Patent
Furlan et al.

(10) Patent No.: US 12,475,382 B2
(45) Date of Patent: Nov. 18, 2025

(54) AUTOMATED INQUIRY ANALYSIS

(71) Applicant: Capital One Services, LLC, McLean, VA (US)

(72) Inventors: Elizabeth Furlan, Plano, TX (US); Chih-Hsiang Chow, Plano, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 391 days.

(21) Appl. No.: 17/306,055

(22) Filed: May 3, 2021

(65) Prior Publication Data

US 2022/0351047 A1      Nov. 3, 2022

(51) Int. Cl.
| | |
|---|---|
| *G06N 5/02* | (2023.01) |
| *G06F 16/22* | (2019.01) |
| *G06Q 30/0282* | (2023.01) |
| *G06N 20/00* | (2019.01) |

(52) U.S. Cl.
CPC ............ *G06N 5/02* (2013.01); *G06F 16/2291* (2019.01); *G06Q 30/0282* (2013.01); *G06N 20/00* (2019.01)

(58) Field of Classification Search
CPC .......... G06N 5/02; G06N 20/00; G06N 20/20; G06F 16/2291; G06Q 30/0282
See application file for complete search history.

(56) References Cited

U.S. PATENT DOCUMENTS

| | | | |
|---|---|---|---|
| 10,706,432 B2 | 7/2020 | Chakraborty et al. | |
| 11,238,075 B1 * | 2/2022 | Hansen | G06F 16/3334 |
| 11,777,874 B1 * | 10/2023 | Semeniuk | G06F 40/30 |
| | | | 704/9 |
| 2008/0300961 A1 | 12/2008 | Cawston et al. | |
| 2014/0358612 A1 | 12/2014 | Sri et al. | |
| 2016/0342911 A1 | 11/2016 | Kannan et al. | |
| 2018/0253780 A1 * | 9/2018 | Wang | H04L 51/02 |
| 2018/0314990 A1 * | 11/2018 | Xue | G06Q 10/04 |

(Continued)

OTHER PUBLICATIONS

Author(s):Syam Title: Machine learning and ai in sales Journal: Elsevier [online]. Publication date: 2018.[retrieved on: Jun. 14, 2023 ]. Retrieved from the Internet: < URL: https://www.sciencedirect.com/science/article/pii/S0019850117302730> (Year: 2018).*

(Continued)

*Primary Examiner* — Sun M Li
(74) *Attorney, Agent, or Firm* — Sterne, Kessler, Goldstein & Fox P.L.L.C.

(57) ABSTRACT

An inquiry analysis system and method are disclosed. An inquiry analysis system includes a computer configured to receive an electronic communication from a user, the electronic communication comprising an inquiry associated with an article of interest. The inquiry analysis system determines one or more measures including a first result of a first trained model based on one or more content elements of the inquiry, a second result of a second trained model based on one or more sentiment elements of the inquiry, and a valuation divergence model result based on a comparison of the inquiry with a reference value associated with the article of interest. The inquiry analysis system calculates and outputs a composite interest prediction which predicts a level of interest of the user associated with the respective article of interest.

14 Claims, 6 Drawing Sheets

(56) References Cited

U.S. PATENT DOCUMENTS

| | | | |
|---|---|---|---|
| 2019/0079921 A1* | 3/2019 | Terry | G06Q 30/02 |
| 2020/0143265 A1* | 5/2020 | Jonnalagadda | G06N 3/045 |
| 2020/0201913 A1* | 6/2020 | Terry | G06Q 30/0281 |
| 2021/0295364 A1* | 9/2021 | Veettil | G06Q 30/0282 |
| 2022/0067296 A1* | 3/2022 | Singh Bawa | G06F 16/2457 |

OTHER PUBLICATIONS

Author(s):ma Title: Machine learning and ai in marketing Journal: Elsevier [online]. Publication date: 2020. [retrieved on: Jan. 11, 2024 ]. Retrieved from the Internet: < URL: https://www.sciencedirect.com/science/article/pii/S0167811620300410 > (Year: 2020).*

Author(s):Lenard Title: conversational AI: how chat bots will reshape Journal: Academia.edu[online]. Publication date: 2019.[ retrieved on: Sep. 7, 2024]. Retrieved from the Internet: < URL: https://www.academia.edu/download/101355950/AI_in_Marketing_Sales_and_Service.pdf#page=95 > (Year: 2019).*

Author(s):Ali, M Title: CRM sales prediction using continuous time evolving classification Journal: aaai [online]. Publication date: 2018.[retrieved on: Mar. 17, 2025]. Retrieved from the Internet: < URL: https://ojs.aaai.org/index.php/AAAI/article/view/11418 > (Year: 2018).*

C. David Kreyenhagen, T. I. Aleshin, J. E. Bouchard, A. M. I. Wise and R. K. Zalegowski, "Using supervised learning to classify clothing brand styles," 2014 Systems and Information Engineering Design Symposium (SIEDS), Charlottesville, VA, USA, 2014, pp. 239-243, doi: 10.1109/SIEDS.2014.6829909. (Year: 2014).*

R. Pasichnyk, M. Susla, L. Honchar and R. Avhustyn, "Mathematical models of websites attendance and methods of its improvement," 2017 14th International Conference The Experience of Designing and Application of CAD Systems in Microelectronics (CADSM), Lviv, Ukraine, 2017, pp. 375-377, (Year: 2017).*

* cited by examiner

AUTOMATED INQUIRY ANALYSIS

BACKGROUND

In sales for articles of consumer interest, such as vehicles and other goods, sellers of such goods are obligated to respond to sales inquiries with little or no information for assessing whether the lead will be fruitful in producing a sale. A pool of potential customers can vary greatly based on interest in or understanding of the article of interest. Other criteria, such as financing available to the potential customer, may not be readily evident to the seller based on the sales inquiry alone. Where the volume of such inquiries can be substantial and the content of each inquiry can be difficult to parse in a timely manner, a need exists for managing sales inquiries and providing vendors with qualitative information about the sales potential of each lead.

FIELD OF THE INVENTION

This application relates generally to predictive modelling, including sentiment and content analysis.

BRIEF SUMMARY OF THE DISCLOSURE

Embodiments described herein reduce the cost and complexity of sorting through leads in a marketplace. Systems and methods provide automated inquiry analysis to score leads, elevate responses to "good leads" while minimizing the time and effort spent responding to inquiries that may ultimately be less fruitful. According to some embodiments, automated inquiry analysis includes performing content modelling, sentiment modelling, and/or valuation modelling to identify serious buyers. In some embodiments, the private marketplace can involve an article of interest, such as a vehicle or other good offered for sale. A score can be provided to a dealer or vendor, to rank potential consumers based at least in part on their respective inquiries. In some embodiments, automated inquiry analysis can include additional factors, such as a consumer's prequalification for financing, or other information about the consumer.

A user may list for sale or other disposition one or more articles of interest, such as a vehicle. The user (e.g., a seller) is enabled to list the vehicle on an automated inquiry analysis platform, and another user, (e.g., a buyer) may use the platform to submit inquiries (e.g., to request a test drive, to submit questions, etc.) to the seller about the article of interest. To mitigate a high volume of inquires or to facilitate the seller's management of such interest, the automated inquiry analysis platform provides predictive modelling that calculates a score for each inquiry gauging a prospective buyer's level of interest based on the submitted inquiry or a series of such inquiries. According to some embodiments, the score may be based on sentiment analysis (e.g., a customer's subjective opinion about the article of interest), content analysis (e.g., what feature(s) a customer is inquiring about), reasonableness of an offered price, or other considerations involving the prospective buyer and associated inquires. Other considerations involving the customer, article of interest, and corresponding inquiries are within the scope of this disclosure.

According to some embodiments, predictive models can be trained based on determining whether questions about content components (also referred to as content elements) or sentiment components (also referred to as sentiment elements) have previously contributed to or are correlated with past sales of the article of interest.

BRIEF DESCRIPTION OF THE DRAWINGS/FIGURES

DETAILED DESCRIPTION

Figure 1:
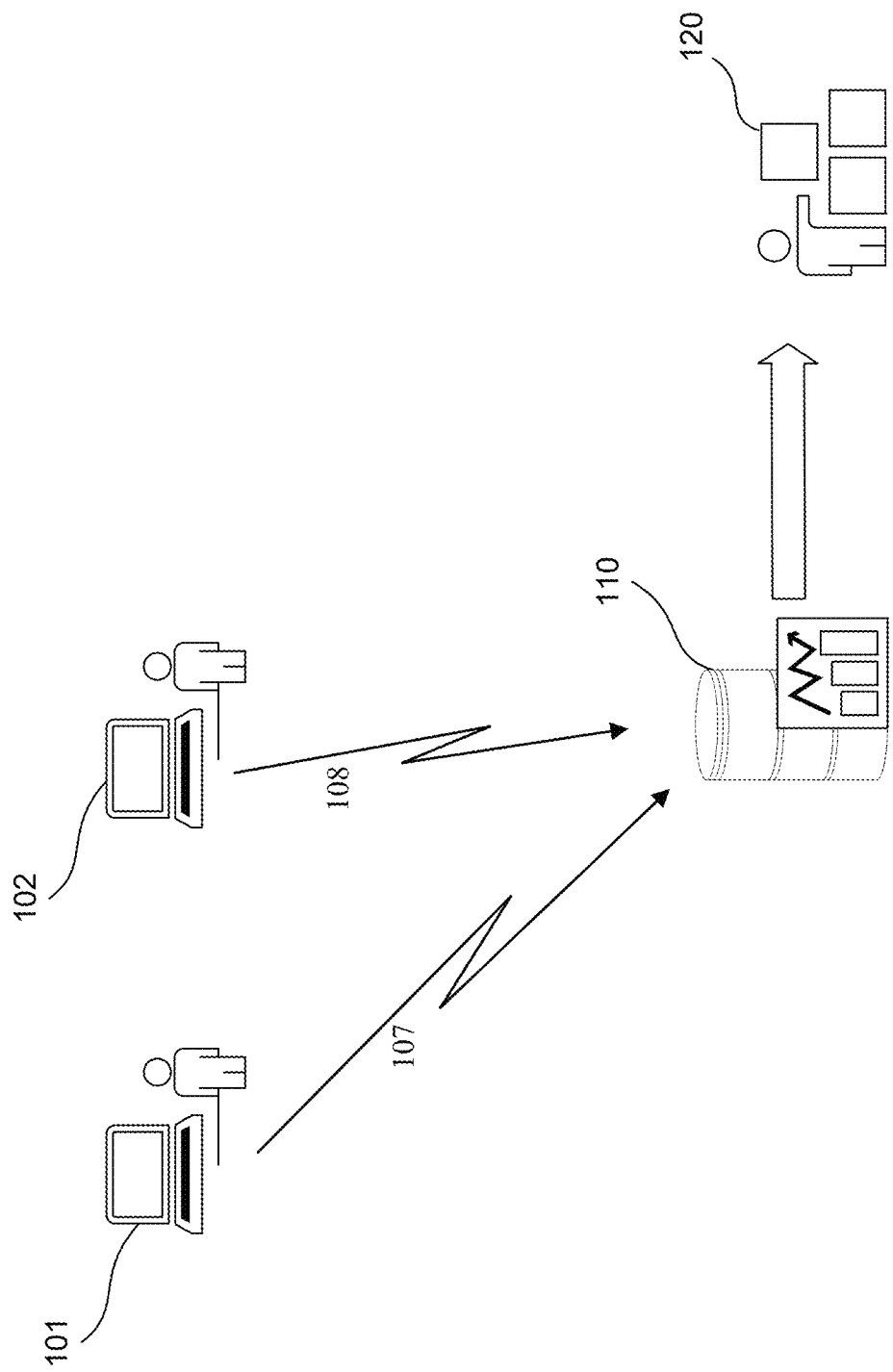
FIG. 1 is an illustration of a general operating environment of an automated inquiry analysis platform, according to some embodiments.

FIG. 1 illustrates an automated inquiry analysis system 100 for processing and managing inquiries involving an article of interest. An article of interest can include a good or merchandise. Referring to FIG. 1, customers 101 and 102 communicate with a vendor 120 by submitting inquiries 107 and 108 via automated modelling platform 110.

In one non-limiting example, customers 101 and 102 may submit inquiries (e.g., electronic communications) 107 and 108 respectively relating to an article of interest, such as a vehicle. Inquiries 107 and 108 can include inquiry content such as content words, content patterns, content sentences, content themes, or combinations thereof. Inquiries 107 and 108 can also include sentiment content, such as sentiment words, sentiment patterns, sentiment sentences, sentiment themes, or combinations thereof. For example, a customer 101 may inquire about a vehicle offered for sale by vendor 120.

In response to the submission of one or more inquiries (e.g., 107 or 108), automated modelling platform 110 generates a trained model based on one or more components, which can include components associated with the article of interest, the consumer that submitted the inquiry (e.g., customer 101 or 102), or the inquiries themselves (e.g., inquiry 107 or 108). In some embodiments, a trained model can be generated based on characteristics of the article of interest. For example, if the article of interest is a vehicle, then a trained model can be based on the vehicle's listed price, color, vehicle history, and any features of the vehicle, such as drivetrain features, electronics, body style, etc.

In some embodiments, the trained model can include a content analysis model, to evaluate any inquiry content including content words, content patterns, content sentences, content themes, or combinations thereof. For example, a content analysis model can draw inferences from the type of inquiry content submitted by a consumer to evaluate that consumer's level of interest in the article. In one non-limited example, the content analysis model may evaluate inquiry content related to features of a vehicle offered for sale on the platform. Customer 101 may submit an inquiry 107 about a listed vehicle that includes inquiry content associated with safety features (e.g., adaptive headlights, blind spot monitoring, electronic stability control, or the like). The trained model can then perform content analysis to draw an inference about inquiry 107 or both, e.g., safety features are a consideration for customer 101. Based on an evaluation performed under the content analysis model, the inquiry content and aspects of a particular vehicle or set of vehicles subject to the inquiry can be the basis for a content analysis score. For example, if the subject vehicle is endowed with many safety features, then the content analysis score can be increased in comparison to an inquiry about a vehicle that is not so provisioned.

In some embodiments, the trained model can include a sentiment analysis model, to evaluate any inquiry sentiment including sentiment words, sentiment patterns, sentiment sentences, sentiment themes, or combinations thereof. Automated modelling platform 110 can evaluate inquiry sentiment to determine sentiment polarity, i.e., positive or negative sentiment, regarding the article of interest, as a whole or with respect to particular aspects thereof. Furthermore, automated modelling platform 110 can apply the trained model to generate a sentiment score associated with the inquiry sentiment. For example, in evaluating inquiry sentiment included in inquiry 107, automated modelling platform 110 can extract a sentiment score (sentiment polarity) of very positive, positive, neutral, negative, or very negative. As described above, automated modelling platform 110 can implement one or more trained models to score submitted inquiries 107 and 108. Automated modelling platform 110 can indicate each score (i.e., a score for each lead) to a vendor, for example, predicting likeliness of a potential to sell the article of interest.

Figure 2:
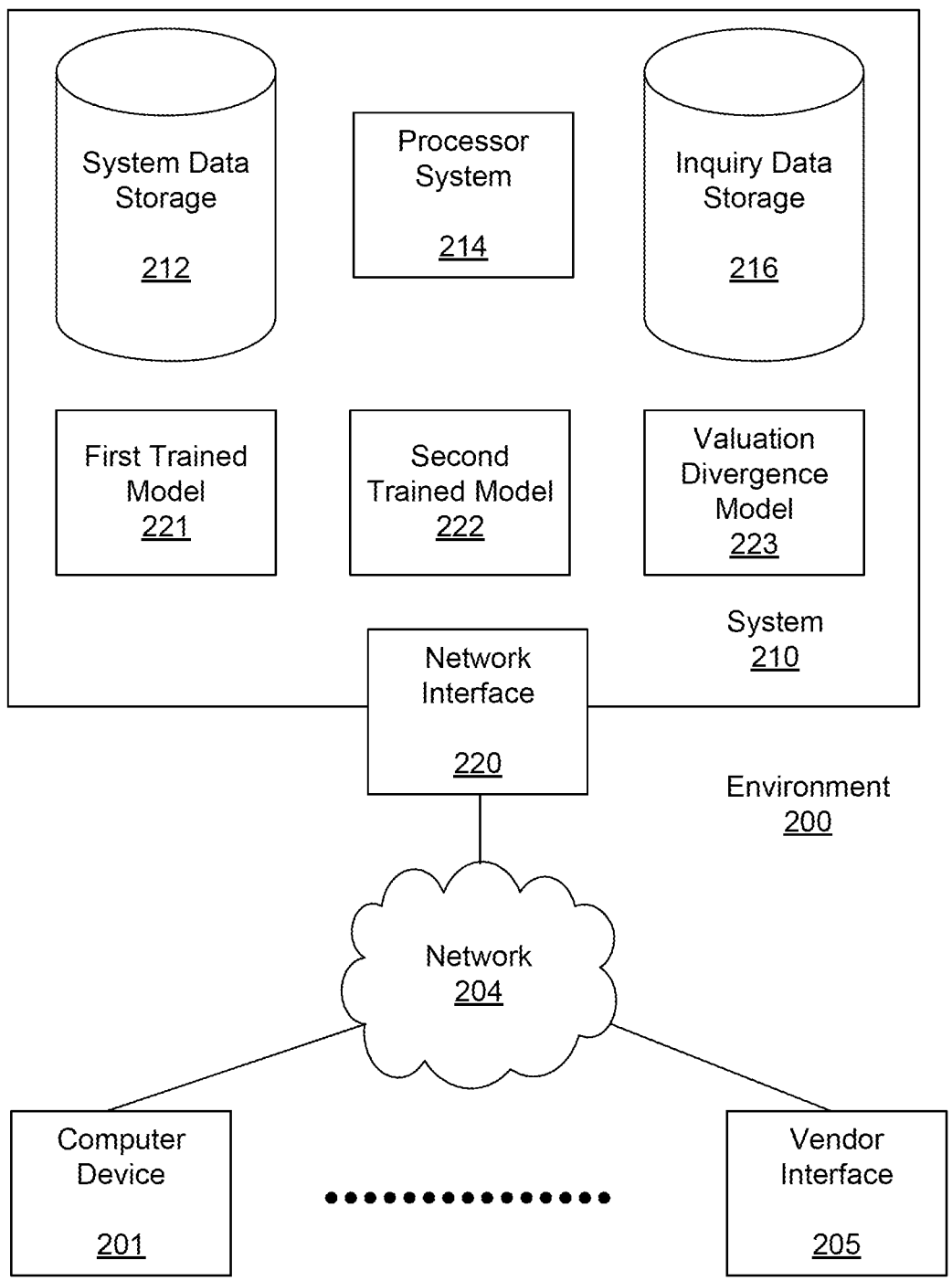
FIG. 2 is an illustration of an automated inquiry analysis system, according to some embodiments.

FIG. 2 illustrates a general operational environment 200 corresponding to automated inquiry analysis system 100. Automated inquiry analysis system (System) 210, which can be an embodiment of an automated modelling platform, can include system data storage 212, processor 214, inquiry data storage 216, first trained model 221, second trained model 222, and valuation divergence model 223.

In some embodiments, a first user, who may be a patron or customer 101 or 102 as described above, may utilize computer device 201 to submit an inquiry about an article of interest to a second user, such as vendor 120. Computer device 201 can connect to a network 204, such that the first user may submit the inquiry to system 210 through a network interface and await a response by the second user. System 210 is configured to process the submitted inquiry and generate a prediction about the inquiry for the second user based on one or more predictive models described below.

System data storage 212 can include data about one or more trained models, such as information about an algorithm, one or more words, patterns, sentences, themes, etc., that are of interest in executing a trained model for predicting a potential consumer's level of interest, and or likeliness to purchase an article of interest.

Inquiry data storage 216 can include one or more datasets in a data collection that may include information corresponding to an inquiry, such as an inquiry submitted by the first user. For example, inquiry data storage 216 can store inquiries 107 and 108, submitted by a first user such as consumers 101 and 102. Inquiry data storage 216 can include one or more datasets in a data collection that may include information corresponding to a first user, such as a patron or consumer enabled to submit inquiries using system 210. Inquiry data storage 216 can additionally include one or more datasets in a data collection that include information corresponding to a second user, such as a vendor, agent, or other users, enabled to receive inquiries using system 210. Further, inquiry data storage 216 can additionally include one or more datasets in a data collection that include information corresponding to an article of interest that may be subject to inquiry by the first user.

Processor 214 is configured to perform operations associated with receiving and analyzing inquiries 107 and 108 submitted to system 210. Processor 214 is also configured to perform operations to output a measure, i.e., the result of such analysis, to the second user. For example, processor 214 is configured to be a trained model by executing algorithms for generating predictions and/or scores related to such predictions for modelling a first user's level of interest and or likeliness to be a buyer of the article of interest. Processor 214 can retrieve instructions stored in a memory related to the one or more algorithms incorporated in at least one of first trained model 221, second trained model 222, or valuation divergence model 223. Further, processor 214 is configured to use training data to allow for the creation of a more accurate (e.g., realistic) trained model. For example, processor 214 is configured to utilize data stored on the basis of one or more prior inquiries and/or one or more prior sales to refine algorithms performed according to at least one of first trained model 221, second trained model 222, and valuation divergence model 223.

First trained model 221 includes one or more algorithms that process data, such as inquiry content, and generate a prediction or score involving the inquiry content. For example, first trained model 221 can be a content analysis model that includes algorithms to evaluate content components or content elements (e.g., from system data storage 212). Content components can include words, patterns, sentences, themes, etc. that involve content relevant to a potential sale of the article of interest. Based on analysis performed by processor 214, first trained model can output a measure, such as a first result or score, associated with the content components. As with the above example where an article of interest is a vehicle, processor 214 may implement first trained model 221 analyzing inquiry content (e.g., for inquiry 107) that emphasizes safety features of the vehicle. In this manner, content components are varied based on association with one or more articles of interest. In some embodiments, first trained model 221 can evaluate the inquiry content based on a relationship to other data, such as the vehicle's features, information about inquiry content for prior inquiries, and the ultimate result of such prior inquiries (i.e., whether the respective inquiries ultimately reached a sale). First trained model 221 can then generate a first result to provide a prediction about the inquiry, where the accuracy of the prediction can be improved by model training (e.g., utilizing the other data).

Second trained model 222 includes one or more algorithms that process data, such as inquiry sentiment, and generate a prediction or score involving the inquiry sentiment. For example, second trained model 222 can be a sentiment analysis model that includes algorithms to evaluate sentiment components or sentiment elements (e.g., from system data storage 212), such as words, patterns, sentences, themes, etc. that involve an opinion or perspective related to the article of interest. Based on analysis performed by processor 214, second trained model can output a measure, such as a second result or score, associated with the sentiment components. Continuing the vehicle example, processor 214 may implement second trained model 222 analyzing inquiry sentiment (e.g., for inquiry 107) that expresses an impression of one or more aspects of the vehicle. In some embodiments, second trained model 222 can evaluate the inquiry content based on a relationship to other data, information about inquiry sentiment for prior inquiries, and the ultimate result of such prior inquiries. Second trained model 222 can generate a second result to provide a prediction about the inquiry. As above, the accuracy of second trained model 222 can be improved utilizing model training based on the other data.

Valuation divergence model 223 generates a prediction or score involving the valuation of the article of interest provided in a subject inquiry. For example, valuation divergence model 223 can compare a value provided by the consumer, such as an offer for the article of interest, to a reference value associated with said article of interest. Continuing the vehicle example, valuation divergence model 223 can compare an offer price extracted from inquiry 107 to a manufacturer suggested retail price (MSRP) for the vehicle, and generate a score based on any divergence to predict a likeliness that inquiry 107 will ultimately prove to be fruitful lead. Based on analysis performed by processor 214, valuation divergence model can output a valuation divergence result associated with the inquiry. In some embodiments, valuation divergence model 223 can evaluate the consumer's valuation based on a relationship to other data, such as valuation divergence results involved in prior inquiries, and the ultimate result of such prior inquiries. Valuation divergence model 223 can generate a valuation divergence result to provide a prediction about the inquiry. As above, the accuracy of valuation divergence model 223 can be improved model training based on the other data.

Based on one or more of the first result, the second result, and the valuation divergence result, processor 214 can calculate a composite interest prediction associated with the inquiry. According to some embodiments, an interest indicator can be output to the vendor by system 210 based on the composite interest prediction, delivering a prediction of a level of interest of the consumer associated with the respective article of interest.

Vendor Interface 205 receives the interest indicator, a predictive score, such as a composite interest prediction, or combinations thereof associated with an inquiry submitted by a first user via computer device 201. For example, the composite interest prediction can be calculated based on a first result of a first trained model 221, a second result of a second trained model 222, and a valuation divergence model 223 result. Vendor interface enables a second user to generate a response to the inquiry. The second user may be a vendor, dealer, broker or agent thereof involved in the listing and/or disposition of an article of interest. Vendor interface can display to the second user a list of inquiries filtered, sorted in an order, or otherwise structured based on the composite interest prediction, or based on one or more of the individual model results (e.g., the first result, the second result, or the valuation divergence model result). Vendor interface 205 can further provide an automated response to certain inquiries, such as inquiries that are not deemed (e.g., based on the composite interest prediction) by system 210 to be good or meaningful leads.

Automated Inquiry Analysis System

Figure 3:
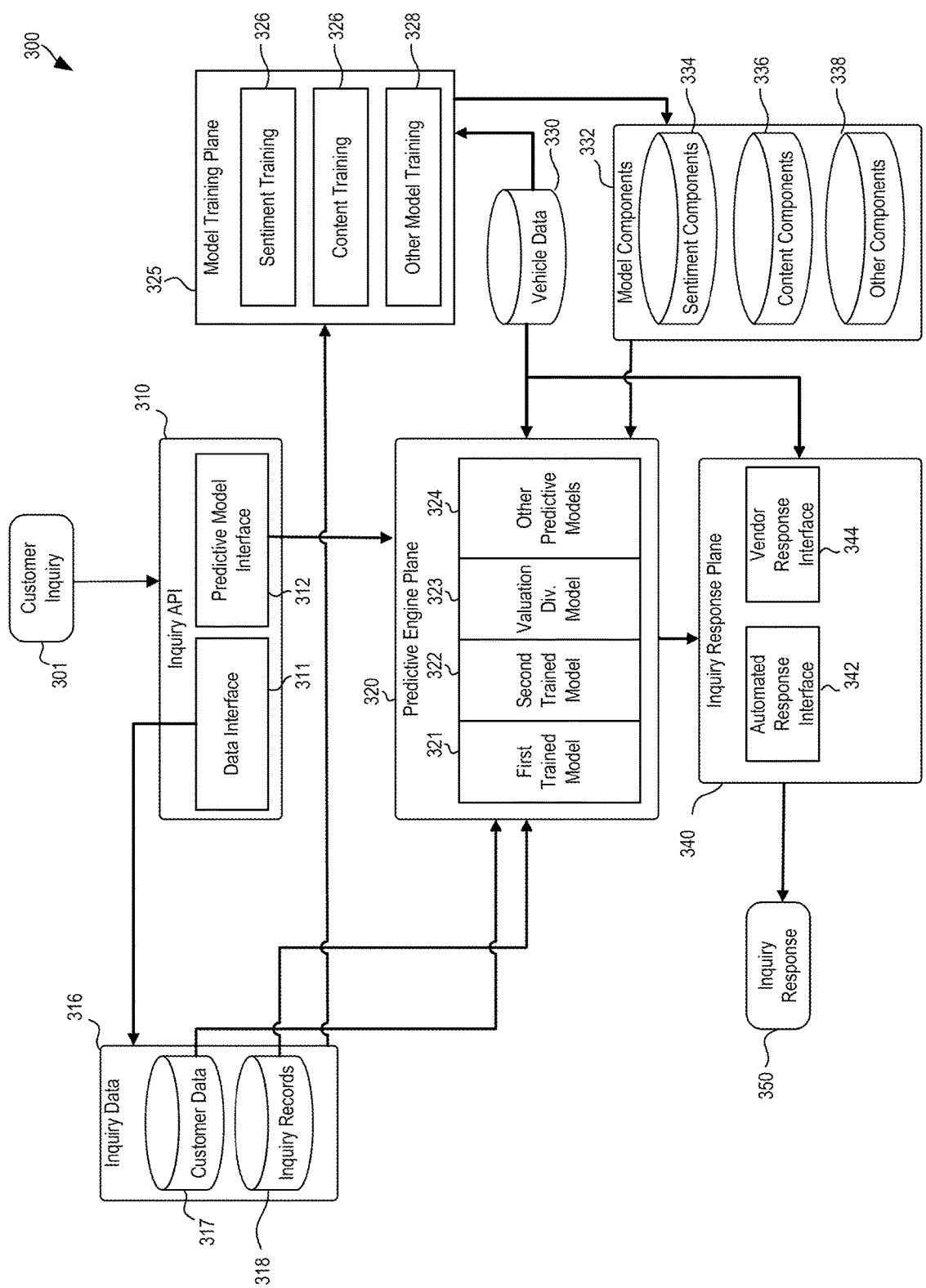
FIG. 3 is an illustration of an automated inquiry analysis system, according to some embodiments.

FIG. 3 illustrates an automated inquiry analysis system (System) 300, which is an embodiment of automated inquiry analysis system 100 or system 210. System 300 can be configured to perform predictive analysis based on customer inquiries, such as customer inquiry 301, to enable generation of an inquiry response 350. Further, system 300 can be configured to train predictive models to better evaluate such inquiries. System 300 can include inquiry API 310, inquiry data 316, predictive engine plane 320, model training plane 325, article of interest data 330, model components 332, and inquiry response plane 340

As described above, an inquiry 301 can include one or more content components, sentiment components, valuation, and other inquiry content. Inquiry API 310 can be configured to receive inquiry 301 from a first user, who may be a customer or consumer interested in an article of interest, and transfer inquiry 301 to one or more inquiry subscribers. Inquiry API 310 can include a data interface 311 configured to output inquiry 301 to a data collection (e.g., inquiry data 316) for storage and/or processing. Inquiry API 310 can also include a predictive model interface 312 configured to output inquiry 301 to one or more predictive model planes for performing predictive analysis.

Inquiry data 316 can include one or more datasets storing customer data 317, and one or more datasets storing inquiry records 318. Customer data 317 can include one or more records about users (e.g., customers 101 or 102) that may submit an inquiry (e.g., inquiry 301) through system 300 about an article of interest. Inquiry records 318 can include one or more records storing information about inquiries 301 introduced by data interface 311. For example, inquiry records 318 can store inquiry 301, which can be an embodiment of inquiries 107 and 108 submitted by a first user such as consumers 101 and 102. Inquiry records 318 can include one or more datasets in a data collection that may include information corresponding to a first user. Further, inquiry data records 318 can additionally include information to identify the article of interest subject to inquiry 301 by the first user. Inquiry records can include a unique inquiry identifier associated to each inquiry 301, and text submitted in the electronic communication by the customer.

Predictive engine plane 320 can include one or more predictive models that permit a processor to perform analysis and evaluate inquiry 301 based on components of each included predictive model. Predictive models can include trained models, for example. In the illustrated example, predictive engine plane 320 can include first trained model 321, second trained model 322, valuation divergence model 323, and other predictive models 324. According to some embodiments, first trained model 321 includes one or more algorithms that process data, such as inquiry content, and generate a prediction or score involving the inquiry content. For example, first trained model 321 can be a sentiment analysis model that includes algorithms to evaluate sentiment components, such as words, patterns, sentences, themes, etc. that involve an opinion or perspective related to the article of interest. First trained model 321 can output a first result associated with the sentiment components. According to an example, second trained model 322 can be a content analysis model that includes algorithms to evaluate content components, such as words, patterns, sentences, themes, etc. that involve content relevant to a potential sale of the article of interest. Second trained model 322 outputs a second result or score associated with the content components. Valuation divergence model 323 generates a prediction or score involving the valuation of the article of interest provided in a subject inquiry. For example, valuation divergence model 323 can compare a value provided by the consumer, such as an offer for the article of interest, to a reference value associated with said article of interest. Valuation divergence model 323 can output a valuation divergence result associated with the inquiry. Other predictive models 324 can evaluate additional factors for performing predictive analysis of a given inquiry 301. In one non-limiting example, other predictive models 324 can include an evaluation of whether a customer that submitted inquiry 301 is prequalified by a lender for financing a purchase of the article of interest. In such case, other predictive models 324 may include a score favoring the inquiry as a meaningful lead. On the basis of one or more of the first result, the second result, and the valuation divergence result, or the result of other predictive models, system 300 can calculate a composite interest prediction associated with the inquiry to be output to inquiry response plane 340.

Model training plane 325 can be provided to perform operations directed to training predictive models, such as first trained model 321, second trained model 322, and other predictive models 324. Model training plane 325 can include sentiment training module 326 to perform operations with an objective of improving the accuracy of first trained model 321, content training module 327 to perform operations with an objective of improving the accuracy of second trained model 322, and other model training module 328 to perform operations to improve the accuracy of other predictive models 324. For example, based on the sale of an article of interest, model training plane 325 can receive data about the disposition from database 330, customer data 317, and/or inquiry records 318. Then, model training plane 325 can generate training data points involving disposition of the article of interest. For example, when a vehicle has been sold or leased, model training plane 325 can determine a disposition of the article of interest and a first user (e.g., patron) associated with the disposition. Model training plane 325 can extract from one or more data collections (e.g., inquiry records 318) information about prior inquiries, including prior inquiries previously stored via data interface 311, that reflected the patron's pre-sale interest in the vehicle. Based on those queries, sentiment training module 326 can define one or more sentiment components that are assessed to have contributed to the sale. Content training module 327 can likewise identify one or more content components that are determined to have been a factor in the sale. And, other model training module 328 can identify whether additional factors, such as attributes relating to the patron (e.g., prequalified financing) exist that influenced the disposition. Where a correlation can be defined by the respective training modules (e.g., sentiment training module 326, content training module 327, other model training module 328), model training plane outputs training data points to model components 332 for incorporation in one or more of sentiment components 334, content components 336, and/or other components 338. In this manner, the accuracy of the prediction can be improved by model training.

System 300 can further include a database 316 to store and identify data about an article of interest such as vehicle data. Database 316 can include information about a specific article of interest, features and attributes thereof, a reference value such as a listed sale price, and disposition information indicating whether the article of interest was sold, leased, or otherwise disposed. In such case, database 316 can include an identifier associated to a customer associated to a disposition of the article of interest. For example, database 316 can include a vehicle identifier field for indexing vehicle records, one or more fields identifying features of the vehicle, a field identifying a disposition of the vehicle, and a customer identifier associated to a record (e.g., corresponding to one or more records in customer data 317) of a customer involved in the disposition.

Model components 332 include one or more datasets of inquiry components for use and weighting by one or more predictive models by predictive engine plane 320. Such datasets can include information about one or more of the trained models, such as information about an algorithm, one or more words, patterns, sentences, themes, etc., that are of interest in executing a trained model for predicting a potential consumer's level of interest, and or likeliness to purchase an article of interest. For example, model components 332 can include sentiment components 334, such as sentiment words, sentiment patterns, sentiment sentences, sentiment themes, etc., that are used by first predictive model 321 to evaluate inquiry 301 and produce a first result based on an opinion or perspective expressed therein. Model components 332 can include content components 336, such as content words, content patterns, content sentences, content themes, etc., that are used by second predictive model 322 to evaluate inquiry 301 and produce a second result based on specific content therein. Further, model components 332 can include other components 338, such as additional factors weighted for predicting a likeliness that inquiry 301 becomes a successful lead involved in the disposition of the article of interest. As noted above, other components 338 can include criteria, such as a customer's prequalification for financing to support a sale, lease or other disposition of the article of interest.

Inquiry Response plane 340 is configured to receive a predictive score, such as a composite interest prediction associated with inquiry 301. In some embodiments, the composite interest prediction is calculated based on a first result of a first trained model 321, a second result of a second trained model 322, a valuation divergence model 323 result, and/or a result of other predictive models 324. Inquiry response plane can include an automated response interface 342 that is configured to populate and send the customer an inquiry response 350. Automated response interface 342 can send the inquiry response based on modelling of inquiry 301 by predictive engine plane 320 without requiring intervention by a vendor, broker, or other agent thereof. Inquiry response plane 340 can also include vendor response interface 344 configured to a prediction, score, or other evaluation result of inquiry 301 to a second user, such as a vendor, broker, or agent (e.g., vendor 120). Vendor response interface 344 can filter, sort in an order, or otherwise structure inquiries 301 based on the quality of the lead, as evaluated according to predictive engine plane 320. Based on inquiry components or other components, vendor interface may also be configured to populate a template of a response for sending by the second user.

Automated Inquiry Analysis Method

Figure 4:
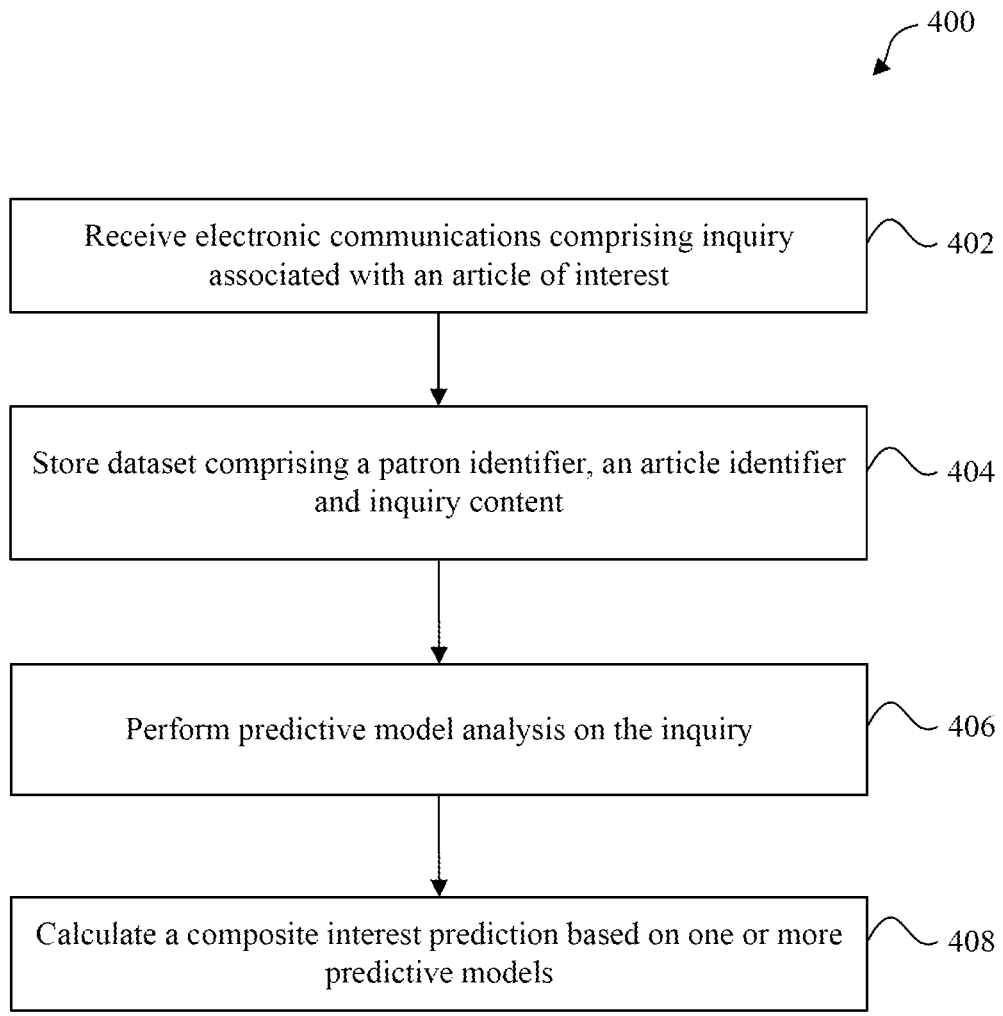
FIG. 4 is a flow diagram illustrating steps involved in using an automated inquiry analysis system, according to some embodiments.

FIG. 4 is a flowchart of exemplary operational steps in an automated inquiry analysis method 400.

At operation 402, system 300 receives an electronic communication containing an inquiry about an article of interest. In an embodiment, inquiry API 310 passes the inquiry (e.g., inquiry 107 or 108) to a data interface 311 and a predictive model interface 312. For example, the customer could ask the following question: "Hi, I'm interested in the Toyota Sienna you have listed. How many miles does it have on it?". The question about the miles may be the inquiry and the article of interest may be a "Toyota Sienna".

At operation 404, system 300 stores one or more datasets corresponding to inquiry information. For example, system 300 stores a dataset in an inquiry data collection (e.g., inquiry data 316) about an inquiry (e.g., inquiry 107 or 108). The stored information can include a patron identifier, an article identifier, and inquiry content associated with the inquiry. Continuing from the above example, system 300 can store one or more data sets about inquiry regarding the "Toyota Sienna".

At operation 406, system 300 performs predictive model analysis on the inquiry. Referring to FIG. 3, predictive model analysis can be performed at 406 by predictive engine plane 320. According to some embodiments, predictive model plane 320 can receive information about an inquiry from predictive model interface 312. According to some embodiments, predictive model plane 320 can also retrieve information about prior inquiries, from inquiry data 316.

For example, one or more of first trained model 321, second trained model 322, valuation divergence model 323, and other predictive models 324 are performed to generate and output one or more model results. In an example, first trained model 321 can be performed based on a sentiment analysis model that includes algorithms to evaluate sentiment components 334 that may be included in the inquiry (e.g., inquiry 107 or 108). Sentiment components may provide connotation or opinion-oriented predictions related to the article of interest. Second trained model 322 can be performed based on a content analysis model that includes algorithms to evaluate content components 335 involving the that may be included in the inquiry. The article of interest or features and attributes thereof may be the subject of the content components. Valuation divergence model 323 can be performed at 406 to evaluate any valuation (e.g., monetary offer) included in given inquiry content based on a reference value associated with the article of interest. For example, if a customer submits an inquiry that expresses the customer's monetary valuation of a vehicle, such as an offer to purchase, valuation divergence model 323 can compare the valuation to a reference value associated with the vehicle. Valuation divergence model 223 generates a prediction or score involving the valuation of the article of interest provided in a subject inquiry. Further, other predictive models 324 can be performed to evaluate an inquiry. In one non-limiting example, predictive model 324 can apply other components 338. One of which may be the status of financial prequalification for an offer to purchase (or lease, or the like) the article of interest. Based on customer data 317 retrieved from inquiry data 316, it may be determined that the customer associated with the present inquiry (e.g., 107 or 108) has obtained a valid prequalification for financing, for example, from a lender. In that case, predictive model 324 can provide a favorable score at 406.

Continuing with the above example, system 300 can perform predictive model analysis on the inquiry regarding the "Toyota Sienna" and the customer's preferences regarding mileage. In particular, one or more of first trained model 321, second trained model 322, valuation divergence model 323, and other predictive models 324 are performed to generate and output one or more model results based on the inquiry regarding the "Toyota Sienna" and prior inquiries. System 300 may identify other vehicles similar to the Toyota Sienna based on the customer's previous inquiries using the predictive model analysis. Furthermore, system 300 may determine that the customer is not interested in vehicles are above a particular mileage threshold based on the customer's previous inquiries using the predictive model analysis.

At operation 408, system 300 calculates a composite interest prediction based on one or more of the predictive models involved at 406. A composite interest prediction may provide some valuation (e.g., a number from 1 to 10, a description such as hot or cold, or the like) describing a predicted likeliness that the inquiry can develop into a meaningful lead. A composite interest prediction can also include an interest indicator, which may be a binary value associated with the strength of the inquiry.

Specifically, results of first trained model 321, second trained model 322, valuation divergence model 323, and predictive model 324 can be compiled or blended into an accurate prediction of the value of the inquiry (e.g., inquiry 107 or 108). That is, the quality of the lead is determined by considering each of the above models. According to some embodiments, predictive engine plane factors one or more predictive model result into the composite score. The results can be factored equally or be assigned different weighting. In some embodiments, the respective weighting of each predictive model result can be adjusted based on model training, involving training data described below. System 300 outputs the composite interest prediction to inquiry response plane 340 for appropriate handling, either by an automated response interface 342 or by the vendor through vendor response interface 344. Additionally or alternatively, system 300 can output any of the above-mentioned results of first trained model 321, second trained model 322, valuation divergence model 323, and predictive model 324 to the inquiry response plane 340.

Continuing with the above example, if the predictive analysis determines that the user does not like vehicles with mileage over 50,000 and the Toyota Sienna has 75,000 miles, the composite interest prediction may be on the lower end. This may indicate that the inquiry has a low likelihood of turning into a meaningful lead. However, if the Toyota Sienna has 25,000 miles, the composite interest prediction may be on the higher end. This may indicate that the inquiry has a high likelihood of turning into a meaningful lead.

Automated Inquiry Analysis with Model Training

Figure 5:
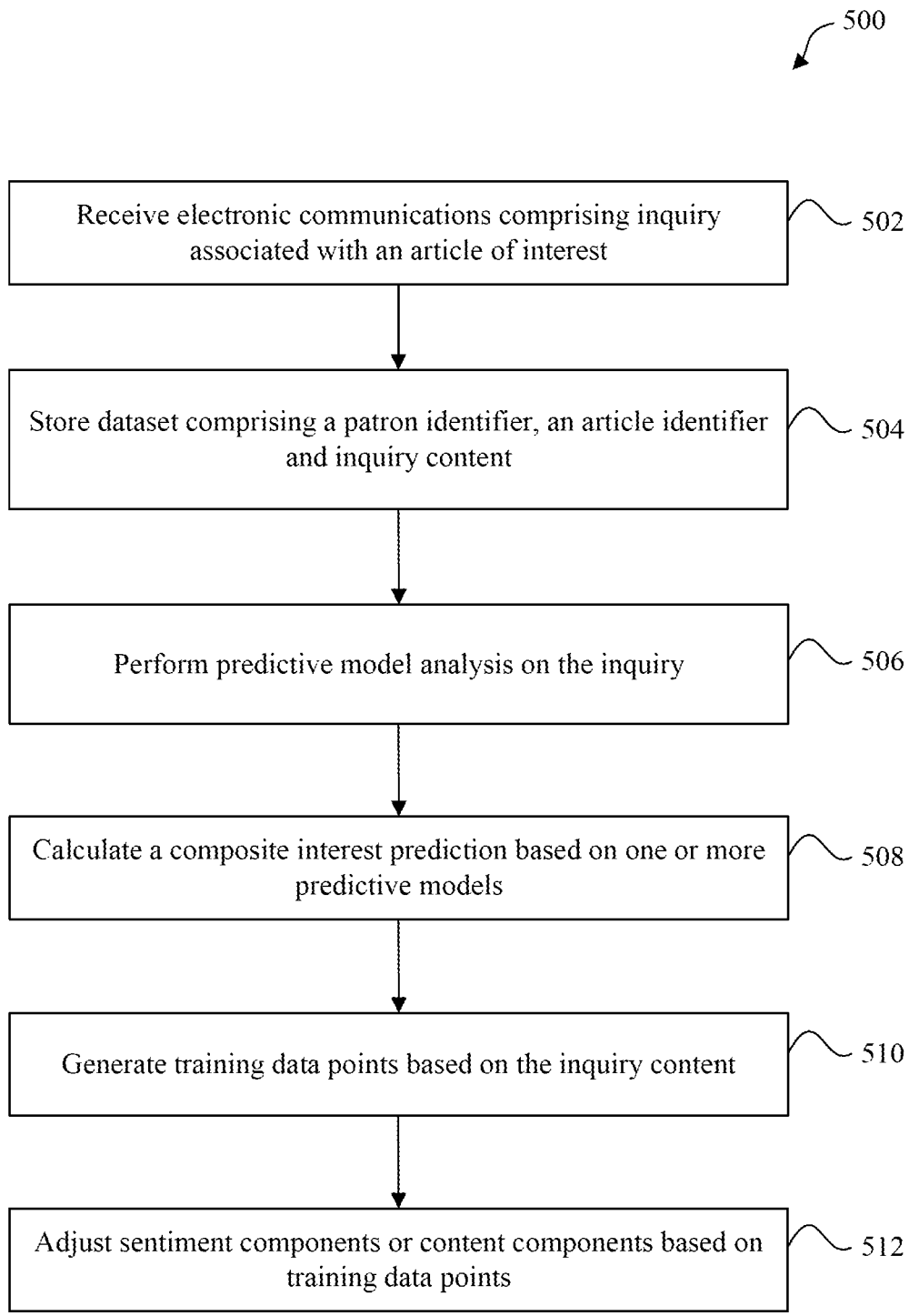
FIG. 5 is a flow diagram illustrating steps involved in using an automated inquiry analysis system, according to some embodiments.

FIG. 5 is a flowchart of exemplary operational steps in an automated inquiry analysis method 500 that include model training steps performed to improve predictions generated by an automated inquiry analysis system.

At operation 502, system 300 receives an electronic communication that includes an inquiry about an article of interest. For example, when customer 101 submits inquiry 107, inquiry API 310 passes the inquiry (e.g., inquiry 107 or 108) to a data interface 311 and a predictive model interface 312.

At operation 504, system 300 stores one or more dataset corresponding to information included in the inquiry. For example, upon receiving an inquiry (e.g., inquiry 107 or 108) system 300 stores a dataset in an inquiry data collection (e.g., inquiry data 316) that includes a patron identifier, an article identifier, and inquiry content associated with the inquiry.

At operation 506, system 300 performs predictive model analysis on the inquiry. According to some embodiments, predictive model analysis can be performed at 506 by predictive engine plane 320. As in 406 above, predictive model plane 320 can receive information about a current and/or prior inquiries from predictive model interface 312 and from inquiry data 316 to perform predictive model analysis.

For example, one or more of first trained model 321, second trained model 322, valuation divergence model 323, and other predictive models 324 are performed to generate and output one or more model results. In an example, first trained model 321 can be performed based on a sentiment analysis model that includes algorithms to evaluate sentiment components 334 that may be included in the inquiry (e.g., inquiry 107 or 108). Sentiment components may provide connotation or opinion-oriented predictions related to the article of interest. Second trained model 322 can be performed based on a content analysis model that includes algorithms to evaluate content components 335 that may be included in the inquiry. The article of interest or features and attributes thereof may be the subject of the content components. Valuation divergence model 323 can be performed at 506 to evaluate any valuation (e.g., monetary offer) included in given inquiry content based on a reference value associated with the article of interest. For example, if a customer submits an inquiry that expresses the customer's monetary valuation of a vehicle, such as an offer to purchase, valuation divergence model 323 can compare the valuation to a reference value associated with the vehicle. Valuation divergence model 223 generates a prediction or score involving the valuation of the article of interest provided in a subject inquiry. Further, other predictive models 324 can be performed to evaluate an inquiry. In one non-limiting example, predictive model 324 can apply other components 338. One of which may be the status of financial prequalification for an offer to purchase (or lease, or the like) the article of interest. Based on customer data 317 retrieved from inquiry data 316, it may be determined that the customer associated with the present inquiry (e.g., 107 or 108) has obtained a valid prequalification for financing, for example, from a lender. In that case, predictive model 324 can provide a favorable score at 506.

At operation 508, system 300 calculates a composite interest prediction based on one or more of the predictive models involved at 506. Specifically, results of first trained model 321, second trained model 322, valuation divergence model 323, and predictive model 324 can be compiled or blended into an accurate prediction of the value of the inquiry (e.g., inquiry 107 or 108). That is, the quality of the lead is determined by considering each of the above models. According to some embodiments, predictive engine plane factors one or more predictive model result into the composite score. The results can be factored equally or be assigned different weighting. In some embodiments, the respective weighting of each predictive model result can be adjusted based on model training, involving training data described below.

At operation 510, system 300 generates one or more training data points based on the inquiry content. For example, at the time of or after a sale of an article of interest, processor 214 can generate training data points involving disposition of the article of interest. In one non-limiting example, on or after the occurrence of a sale or lease of a vehicle, processor 214 can execute instructions to determine a disposition of the article of interest and a patron associated with the disposition. The disposition may be a sale or lease executed for the article of interest, such as a vehicle, for example. The patron may be associated with a patron identifier, such as a unique identifier indexed to the patron involved in the disposition. Then, processor 214 can execute instructions to select inquiry content from one or more of the datasets based on the selected patron identifier that correspond to the patron associated with the disposition of the article of interest. For example, if customer 102 is identified as the purchaser of a vehicle, then processor 214 can perform a query of one or more inquiries 108 by customer 102 about the vehicle to identify inquiry content for a correlation to such disposition. Processor 214 can execute instructions to select content components, sentiment components, and/or other components from one or more of the datasets based on the selected patron identifier that corresponds to the patron associated with the disposition of the article of interest.

Likewise, processor 214 can execute instructions at 510 to determine inquiries (e.g., inquiry 107) about the article of interest that were not fruitful in the disposition. That is, processor 214 can execute instructions to select content components, sentiment components, and/or other components from one or more of the datasets based on selected patron identifiers that submitted inquiries about the article of interest, but that were not involved in its disposition.

At operation 512, processor 214 can process training data points generated at 510 to adjust sentiment components, content components and/or other trained model components. For example, where training data points involve a disposition of an article of interest, processor 214 can execute instructions to incorporate content components 336, sentiment components 334, or other components 338 that are identified at 510, into the respective training model (e.g., sentiment training module 326, content training module 327, other model training module 328). In some embodiments, inquiry content is incorporated to reflect the correlation of the incorporated content components 336, sentiment components 334, or other components 338 with a successful disposition (e.g., sale) of the article of interest. In some embodiments, where the content components, sentiment components, or other components already exist in the respective training model, a respective weighting of each component can be adjusted to reflect the correlation to a disposition of the article of interest.

Figure 6:
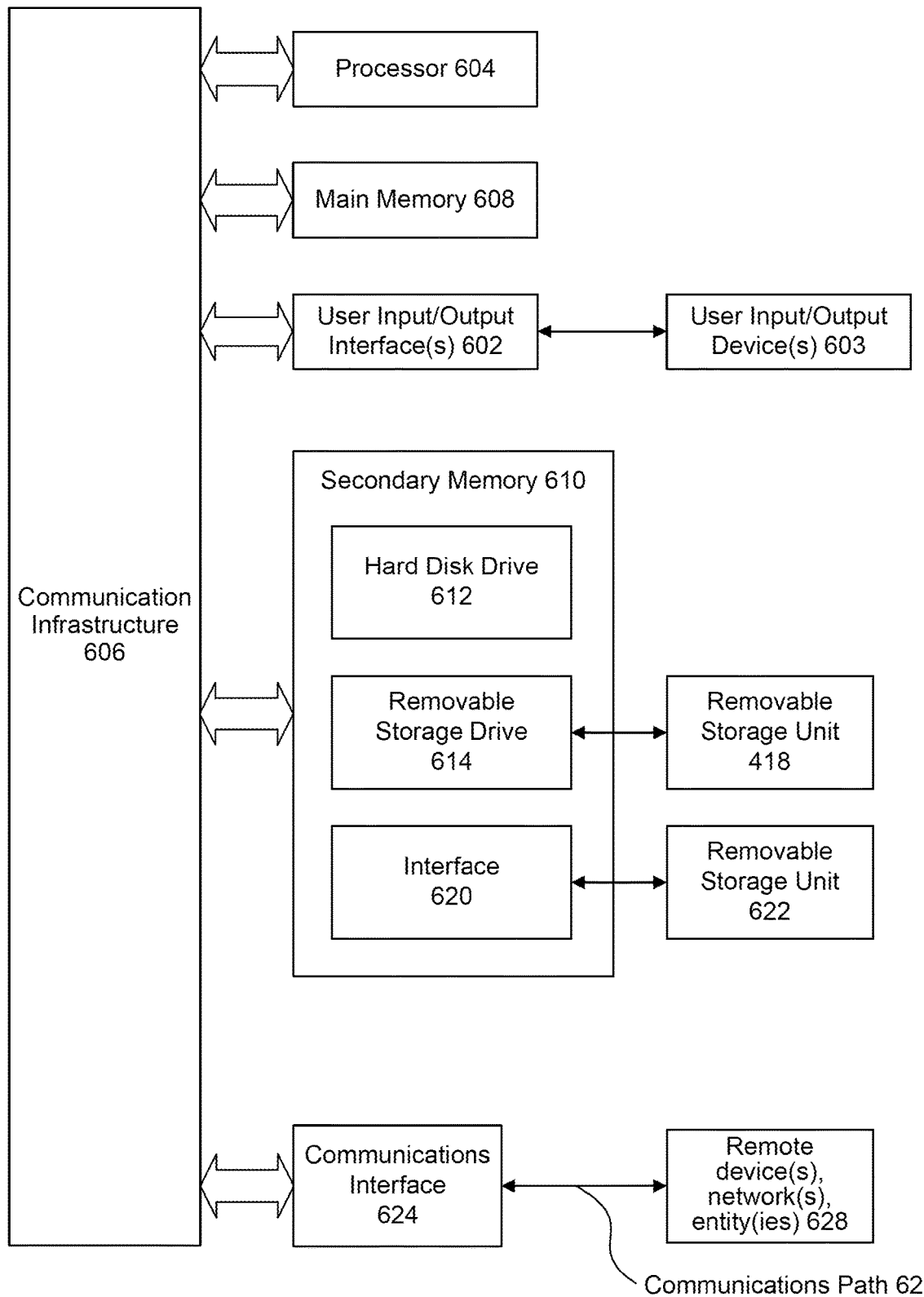
FIG. 6 is an example computing device, according to an exemplary embodiment.

Various aspects of the disclosure can be implemented by software, firmware, hardware, or a combination thereof. FIG. 6 illustrates an example computer system 600 in which some embodiments, or portions thereof, can be implemented as computer-readable code. Various embodiments are described in terms of the example computer system 600. After reading this description, it will become apparent to a person skilled in the relevant art how to implement the embodiments using other computer systems and/or computer architectures. For example, automated inquiry analysis system 100, system 200 or 300, etc., may be implemented by computer system 600.

Computer system 600 includes one or more processors, such as processor 604. Processor 604 may comprise suitable logic, circuitry, dedicated circuits, and/or code that may enable processing data and/or controlling operations of computer system 600. Processor 604 can be a special purpose or a general purpose processor. Processor 604 may be connected to a communication infrastructure 606 (for example, a bus or network). Processor 604 may be enabled to provide control signals to the various other portions of computer system 600 via communication infrastructure 606, for example.

Computer system 600 also includes a main memory 608, and may also include a secondary memory 609. Secondary memory 609 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 615 in a well-known manner. Removable storage unit 615 may comprise a floppy disk, magnetic tape, optical disk, etc. that is read by and written to by removable storage drive 614. As will be appreciated by persons skilled in the relevant art(s), removable storage unit 615 includes a computer usable storage medium having stored therein computer software and/or data.

In alternative implementations, secondary memory 609 may include other similar means for allowing computer programs or other instructions to be loaded into computer system 600. Such means may include, for example, a removable storage unit 617 and an interface 616. Examples of such means may include a program cartridge and cartridge interface (such as that found in video game devices), a removable memory chip (such as an EPROM, or PROM) and associated socket, and other removable storage units 617 and interfaces 616 that allow software and data to be transferred from the removable storage unit 617 to computer system 600.

Computer system 600 may also include a communications interface 624. Communications interface 624 allows software and data to be transferred between computer system 600 and external devices (such as a server of one or more embodiments as described above) 620. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 610. Communications path 610 carries signals and may be implemented using wire or cable, fiber optics, a phone line, a cellular phone link, an RF link or other communications channels. As in the disclosed embodiments, communications path 610 may be configured to enable communications between computer system 600 and external devices such as server 620 in real time, for example, utilizing a full-duplex communication channel.

In this document, the terms "computer program medium" and "computer usable medium" are used to generally refer to media such as removable storage unit 615, removable storage unit 617, and a hard disk installed in hard disk drive 612. Computer program medium and computer usable medium can also refer to memories, such as main memory 608 and secondary memory 609, which can be memory semiconductors (e.g., DRAMs, etc.). These computer program products are means for providing software to computer system 600.

Computer programs (also called computer control logic) are stored in main memory 608 and/or secondary memory 609. Computer programs may also be received via communications interface 624. Such computer programs, when executed, enable computer system 600 to implement the embodiments as discussed herein. In particular, the computer programs, when executed, enable processor 604 to implement the disclosed processes, such as the operations in the method 400 and 500 of FIGS. 4 and 5, as discussed above. Accordingly, such computer programs represent controllers of the computer system 600. Where the embodiments are implemented using software, the software may be stored in a computer program product and loaded into computer system 600 using removable storage drive 614, interface 616, hard drive 612 or communications interface 624. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method, comprising:
  receiving, by a computing device, a respective inquiry associated with articles of interest from each of a plurality of user devices;
  performing, by a processor, predictive modeling configured to generate training data points based on content of the respective inquiry from each of the plurality of user devices gauging a prospective buyer's level of interest, for the respective inquiry from each of the plurality of user devices, the performing comprising:
    receiving:
      a first result from a first trained model that indicates an article of interest based on a content element of the respective inquiry that describes content associated with the articles of interest, a second result from a second trained model that indicates a sentiment for the article of interest based on a sentiment element of the respective inquiry, a third result from a valuation divergence model that indicates a divergence from a value proposal for the article of interest from a reference value associated with the article of interest based on a value element of the respective inquiry, and generating a respective composite interest score that indicates a level of interest for the article of interest based on the first result, the second result, and the third result;

providing the respective inquiries from a first set of user devices of the plurality of user devices based on the respective composite interest scores satisfying a scoring threshold to a user to respond to the respective inquiries from the first set of user devices;

providing an indication of another article of interest to a second set of user devices of the plurality of user devices based on the respective composite interest scores being less than the scoring threshold;

generating, by the processor, an automated response to the indication;

determining, by the processor, which of the respective inquiries resulted in a respective sale;

identifying, by the processor, one or more queries associated with each respective inquiry resulting in the respective sale;

identifying, by the processor, one or more content components, from the one or more queries, determined to have been a factor in the respective sale; and retraining, by the processor, the second trained model based on the one or more content components determined to have been a factor in the respective sale.

2. The computer-implemented method of claim 1,
wherein the content element comprises at least one of a content word, a content pattern, a content-related sentence, or a content theme,
wherein the sentiment element comprises at least one of a sentiment word, a sentiment pattern, a sentiment-related sentence, or a sentiment theme.

3. The computer-implemented method of claim 1, wherein the retraining at least one of the first trained model, the second trained model, or the valuation divergence model comprises at least adjusting at least one of the sentiment element, the content element, or the reference value based on a disposition of the article of interest.

4. The computer-implemented method of claim 1, further comprising, for each user device of the plurality of user devices, storing a dataset comprising an identifier of the user device, an identifier of the article of interest, and an indication of the respective inquiry.

5. The computer-implemented method of claim 1, wherein the article of interest comprises at least one of a vehicle, a good, or a service.

6. A system comprising:
a memory; and
at least one processor coupled to the memory, wherein the at least one processor is configured to perform operations comprising:
receiving a respective inquiry associated with articles of interest from each of a plurality of user devices;
performing, by the at least one processor, predictive modeling configured to generate training data points based on content of the respective inquiry from each of the plurality of user devices gauging a prospective buyer's level of interest, for the respective inquiry from each of the plurality of user devices, the performing comprising:
receiving:
a first result from a first trained model that indicates an article of interest based on a content element of the respective inquiry that describes content associated with the articles of interest,
a second result from a second trained model that indicates a sentiment for the article of interest based on a sentiment element of the respective inquiry,
a third result from a valuation divergence model that indicates a divergence from a value proposal for the article of interest from a reference value associated with the article of interest based on a value element of the respective inquiry, and
generating a respective composite interest score that indicates a level of interest for the article of interest based on the first result, the second result, and the third result;
providing the respective inquiries from a first set of user devices of the plurality of user devices based on the respective composite interest scores satisfying a scoring threshold to a user to respond to the respective inquiries from the first set of user devices;
providing an indication of another article of interest to a second set of user devices of the plurality of user devices based on the respective composite interest scores being less than the scoring threshold;
generating, by the at least one processor, an automated response to the indication;
determining, by the at least one processor, which of the respective inquiries resulted in a respective sale;
identifying, by the at least one processor, one or more queries associated with each respective inquiry resulting in the respective sale;
identifying, by the at least one processor, one or more content components, from the one or more queries, determined to have been a factor in the respective sale; and
retraining, by the at least one processor, the second trained model based on the one or more content components determined to have been a factor in the respective sale.

7. The system of claim 6,
wherein the content element comprises at least one of a content word, a content pattern, a content-related sentence, or a content theme,
wherein the sentiment element comprises at least one of a sentiment word, a sentiment pattern, a sentiment-related sentence, or a sentiment theme.

8. The system of claim 6, wherein the retraining at least one of the first trained model, the second trained model, or the valuation divergence model comprises at least adjusting at least one of the sentiment element, the content element, or the reference value based on a disposition of the article of interest.

9. The system of claim 6, the operations further comprising, for each user device of the plurality of user devices, storing a dataset comprising an identifier of the user device, an identifier of the article of interest, and an indication of the respective inquiry.

10. The system of claim 6, wherein the article of interest comprises at least one of a vehicle, a good, or a service.

11. A non-transitory tangible computer-readable medium having instructions stored thereon that, when executed by a computing device, cause the computing device to perform operations comprising:
- receiving a respective inquiry associated with articles of interest from each of a plurality of user devices;
- performing, by the computing device, predictive modeling configured to generate training data points based on content of the respective inquiry from each of the plurality of user devices gauging a prospective buyer's level of interest, for the respective inquiry from each of the plurality of user devices, the performing comprising:
  - receiving:
    - a first result from a first trained model that indicates an article of interest based on a content element of the respective inquiry that describes content associated with the articles of interest,
    - a second result from a second trained model that indicates a sentiment for the article of interest based on a sentiment element of the respective inquiry,
    - a third result from a valuation divergence model that indicates a divergence from a value proposal for the article of interest from a reference value associated with the article of interest based on a value element of the respective inquiry, and
  - generating a respective composite interest score that indicates a level of interest for the article of interest based on the first result, the second result, and the third result;
- providing the respective inquiries from a first set of user devices of the plurality of user devices based on the respective composite interest scores satisfying a scoring threshold to a user to respond to the respective inquiries from the first set of user devices;
- providing an indication of another article of interest to a second set of user devices of the plurality of user devices based on the respective composite interest scores being less than the scoring threshold;
- generating, by the computing device, an automated response to the indication;
- determining, by the computing device, which of the respective inquiries resulted in a respective sale;
- identifying, by the computing device, one or more queries associated with each respective inquiry resulting in the respective sale;
- identifying, by the computing device, one or more content components, from the one or more queries, determined to have been a factor in the respective sale; and
- retraining, by the computing device the second trained model based on the one or more content components determined to have been a factor in the respective sale.

12. The non-transitory tangible computer-readable medium of claim 11,
wherein the content element comprises at least one of a content word, a content pattern, a content-related sentence, or a content theme,
wherein the sentiment element comprises at least one of a sentiment word, a sentiment pattern, a sentiment-related sentence, or a sentiment theme.

13. The non-transitory tangible computer-readable medium of claim 11, wherein the retraining at least one of the first trained model, the second trained model, or the valuation divergence model comprises at least adjusting at least one of the sentiment element, the content element, or the reference value based on a disposition of the article of interest.

14. The non-transitory tangible computer-readable medium of claim 11, wherein the article of interest comprises at least one of a vehicle, a good, or a service.

* * * * *